(12) United States Patent
Chou et al.

(10) Patent No.: US 10,241,496 B2
(45) Date of Patent: Mar. 26, 2019

(54) MULTI-AXIS MOTOR SYNCHRONIZATION CONTROL SYSTEM AND METHOD THEREOF

(71) Applicant: Industrial Technology Research Institute, Hsin-Chu (TW)

(72) Inventors: Po-Huan Chou, Taipei (TW); Wen-Chuan Chen, Hsinchu (TW); Feng-Chi Li, Yunlin County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 285 days.

(21) Appl. No.: 14/955,627

(22) Filed: Dec. 1, 2015

(65) Prior Publication Data

US 2017/0038758 A1 Feb. 9, 2017

(30) Foreign Application Priority Data

Aug. 6, 2015 (TW) .............................. 104125693 A

(51) Int. Cl.
*G05B 19/402* (2006.01)
(52) U.S. Cl.
CPC .. *G05B 19/402* (2013.01); *G05B 2219/34015* (2013.01); *G05B 2219/50218* (2013.01)
(58) Field of Classification Search
None
See application file for complete search history.

(56) References Cited

U.S. PATENT DOCUMENTS

| 5,646,495 A | 7/1997 | Toyozawa et al. |
| 7,183,739 B2 | 2/2007 | Iwashita et al. |

(Continued)

FOREIGN PATENT DOCUMENTS

| CN | 1992504 A | 7/2007 |
| CN | 102129251 | 7/2011 |

(Continued)

OTHER PUBLICATIONS

'Synchronization Controller Synthesis of Multi-Axis Motion System', Cheng et al., 2009 Fourth International Conference on Innovative Computing, Information and Control, pp. 918-921, IEEE (2009).*

(Continued)

*Primary Examiner* — Bernard G Lindsay
(74) *Attorney, Agent, or Firm* — WPAT, PC

(57) ABSTRACT

A multi-axis motor synchronization control system is provided, which may include a plurality of driving axes and the driving axes are coupled to one another; each of the driving axes may include a position loop controller, a velocity loop controller, a motor and a synchronization calibration device. The position loop controller may generate a velocity signal according to a position command. The velocity loop controller may generate a velocity command according to the velocity signal. The motor may operate according to the velocity command. The synchronization calibration device may calculate the average value of the position signal of the motor and the position signals of the motors of the adjacent driving axes, and then feedback the average value to the position loop controller so as to perform the synchronization calibration.

12 Claims, 11 Drawing Sheets

(56) References Cited

U.S. PATENT DOCUMENTS

| | | | |
|---|---|---|---|
| 7,531,981 B2 | 5/2009 | Iwashita et al. | |
| 8,334,669 B2 | 12/2012 | Nagato | |
| 8,364,288 B2 | 1/2013 | Chang et al. | |
| 2003/0074120 A1* | 4/2003 | Kleinau | B62D 5/0463 701/41 |
| 2011/0169441 A1* | 7/2011 | Yoshiura | G05B 19/4141 318/625 |
| 2012/0059506 A1* | 3/2012 | Okita | G05B 13/0265 700/173 |
| 2013/0285589 A1 | 10/2013 | Sugie et al. | |
| 2015/0202814 A1* | 7/2015 | Maruyama | B29C 45/77 425/145 |
| 2016/0004248 A1* | 1/2016 | Oda | G05B 19/19 700/170 |

FOREIGN PATENT DOCUMENTS

| | | |
|---|---|---|
| CN | 103123478 | 5/2013 |
| CN | 104362908 A | 2/2015 |
| TW | 591880 | 6/2004 |
| TW | 200412709 | 7/2004 |
| TW | 200729673 | 8/2007 |
| TW | 201251301 | 12/2012 |
| TW | 201426229 | 7/2014 |
| TW | 201514643 | 4/2015 |

OTHER PUBLICATIONS

Taiwan Intellectual Property Office, Office Action dated May 23, 2016.

Dong Sun et al., "A Model-Free Cross-Coupled Control for Position Synchronization of Multi-Axis Motions: Theory and Experiments," in Control Systems Technology, IEEE Transactions on , vol. 15, No. 2, pp. 306-314, Mar. 2007 doi: 10.1109/TCST.2006.883201.

Seok-Kwon Jeong et al., "Precise position synchronous control of multi-axis servo system", Mechatronics, vol. 18, Issue 3, Apr. 2008, pp. 129-140, ISSN 0957-4158, http://dx.doi.org/10.1016/j.mechatronics.2007.10.009.

Yong Xiao et al., "Generalized synchronization control of multi-axis motion systems", Control Engineering Practice, vol. 13, Issue 7, Jul. 2005, pp. 809-819, ISSN 0967-0661, http://dx.doi.org/10.1016/j.conengprac.2004.09.005.

Dong Sun, "Position synchronization of multiple motion axes with adaptive coupling control", Automatica, vol. 39, Issue 6, Jun. 2003, pp. 997-1005, ISSN 0005-1098, http://dx.doi.org/10.1016/S0005-1098(03)00037-2.

Dong Sun et al., "A Synchronization Approach to Trajectory Tracking of Multiple Mobile Robots While Maintaining Time-Varying Formations," in Robotics, IEEE Transactions on , vol. 25, No. 5, pp. 1074-1086, Oct. 2009 doi: 10.1109/TRO.2009.2027384.

Zhao, D et al., "Robust adaptive terminal sliding mode-based synchronised position control for multiple motion axes systems," in Control Theory & Applications, IET , vol. 3, No. 1, pp. 136-150, Jan. 2009 doi: 10.1049/iet-cta:20070272.

State Intellectual Property Office of the People's Republic of China , "Office Action", dated May 23, 2018.

Marvin H. Cheng, et al., "Adaptive Robust Control of Tracking and Synchronization for Multi-Axis Motion System", Jun. 29-Jul. 1, 2011, pp. 1-6, 2011 American Control Conference.

Liu Ran et al, "Research on multi-drive synchronization control based on ring coupling strategy", Jun. 2011, vol. 26 No. 6, China Academic Journal Electronic Publishing House.

* cited by examiner

MULTI-AXIS MOTOR SYNCHRONIZATION CONTROL SYSTEM AND METHOD THEREOF

CROSS REFERENCE TO RELATED APPLICATION

This application also claims priority to Taiwan Patent Application No. 104125693 filed in the Taiwan Patent Office on Aug. 6, 2015, the entire content of which is incorporated herein by reference.

TECHNICAL FIELD

The present disclosure relates to a control system, in particular to a synchronization control system for multi-axis motors. The present disclosure further relates to the control method of the synchronization control system.

BACKGROUND

High speed and high precision are always the aims of the development of machine tools; however, machine tools for different purposes have different problems to be overcome; besides, when the size of work pieces becomes larger, the size of machine tools will also become larger; for example, in recent years, machine tools are used to manufacturing large-size panels and large-size solar panels. Previously, regarding the control applications of X-Y platform or multi-axis machine tool, each axis is driven by one motor; however, for the purpose of conforming to the requirements of high acceleration, high thrust power, and high rigidity, multi-axis motor system is developed. The position errors and the velocity errors of the multi-axis motor system will not only influence its precision, but also may deform its mechanical structure, which may damage the controlled system, or even danger the operators.

Many patent literatures have proposed a variety of multi-axis motor synchronization control systems so as to overcome the above problems, such as U.S. Pat. No. 7,183,739, U.S. Pat. No. 5,646,495, and Taiwan Patent Publication No. 200729673, etc. However, these patent literatures still have a lot of shortcomings to be overcome.

Therefore, it has become an important issue to provide a multi-axis motor synchronization control system to improve the shortcomings of the conventional multi-axis motor synchronization control systems.

SUMMARY

The present disclosure is related to a multi-axis motor synchronization control system. In one embodiment of the disclosure, the multi-axis motor synchronization control system may include a plurality of driving axes and the driving axes may be coupled to one another; each of the driving axes may include a position loop controller, a velocity loop controller, a motor and a synchronization calibration device. The position loop controller may generate a velocity signal according to a position command. The velocity loop controller may generate a velocity command according to the velocity signal. The motor may operate according to the velocity command. The synchronization calibration device may calculate the average value of the position signal of the motor and the position signals of the motors of the adjacent driving axes, and then feedback the average value to the position loop controller so as to perform the synchronization calibration for the multi-axis motor synchronization control system.

The present disclosure is further related to a multi-axis motor synchronization method, wherein the method may be applicable to a multi-axis motor synchronization control system, and the multi-axis motor synchronization control system may include a plurality of driving axes, and the driving axes may be coupled to one another. In one embodiment of the disclosure, the method may include the following steps: transmitting a position command to the position loop controller of each of the driving axes to generate a plurality of velocity signals; transmitting each of the velocity signals to the velocity loop controller of each of the driving axes to generate a plurality of velocity commands to drive the motors of the driving axes respectively; calculating the average value of the position feedback signal of the motor of each of the driving axes and the position feedback signals of the motors of the adjacent driving axes; and feeding back each of the average values to the position loop controller of the corresponding driving axis so as to perform the synchronization calibration for the multi-axis motor synchronization control system.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
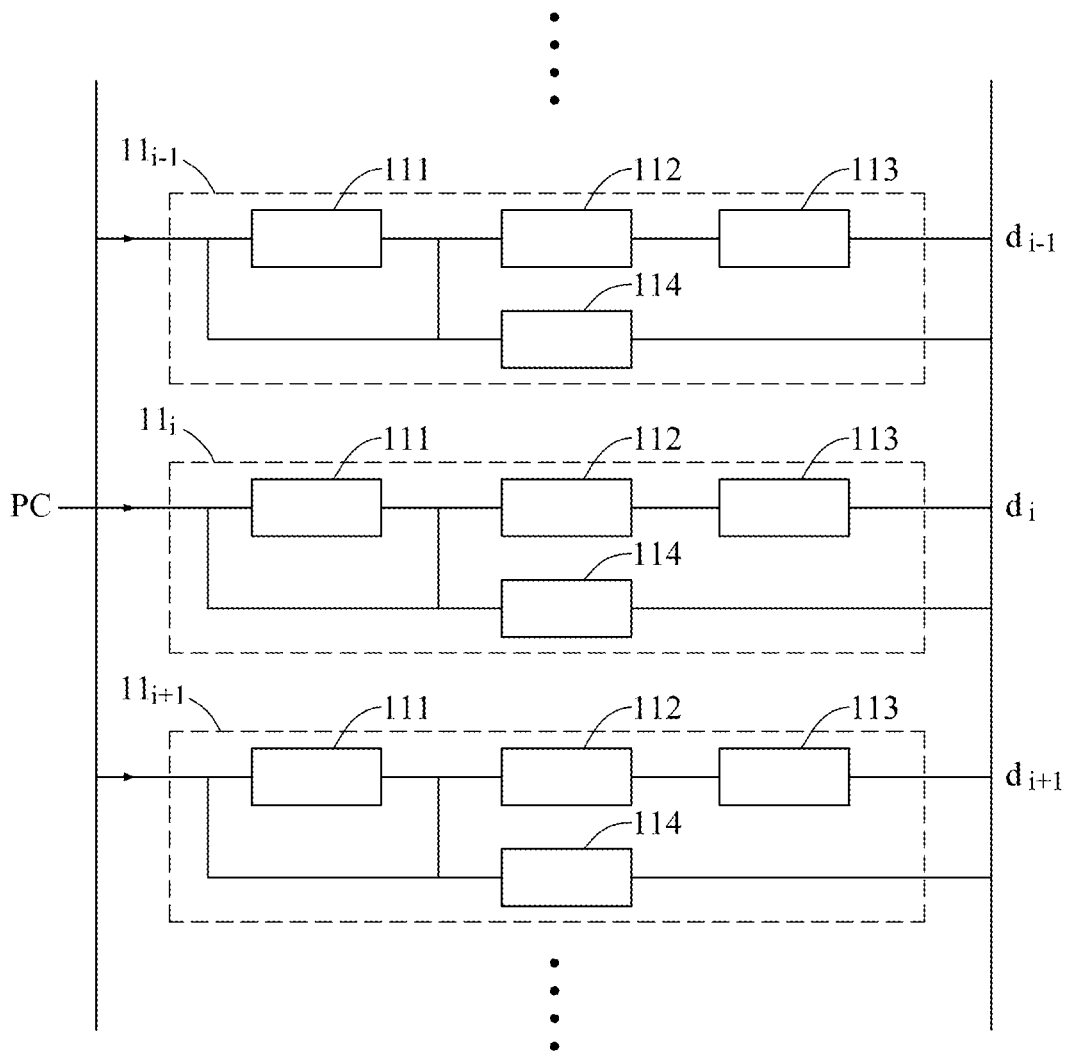
FIG. 1 is the block diagram of the first embodiment of the multi-axis motor synchronization control system in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is the block diagram of the first embodiment of the multi-axis motor synchronization control system in accordance with the present disclosure. As shown in FIG. 1, the multi-axis motor synchronization control system 1 may include a plurality of driving axes $11_{i-1}$, $11_i$, $11_{i+1}$; each of the driving axes $11_{i-1}$, $11_i$, $11_{i+1}$ may include a position loop controller 111, a velocity loop controller 112, a motor 113, and a synchronization calibration device 114.

Regarding the driving axis $11_i$, the position loop controller 111 may generate the velocity signal according to the position command, and transmit the velocity signal to the velocity loop controller 112. The velocity loop controller 112 may generate the velocity command according to the velocity signal, and transmit the velocity command to the motor 113. The motor 113 can operate according to the velocity command. The synchronization calibration device 114 may calculate the average value of the position feedback signal $d_i$ of the motor 113 of the driving axis $11_i$ and the position feedback signals, $d_{i-1}$, $d_{i+1}$, of the adjacent driving axes, $11_{i-1}$, $11_{i+1}$, and then feedback the average value to the position loop controller 111 and the velocity loop controller 112 of the driving axis $11_i$. Each of the driving axes of the multi-axis motor synchronization control system 1 may execute the above process in order to perform the synchronization calibration.

Figure 2:
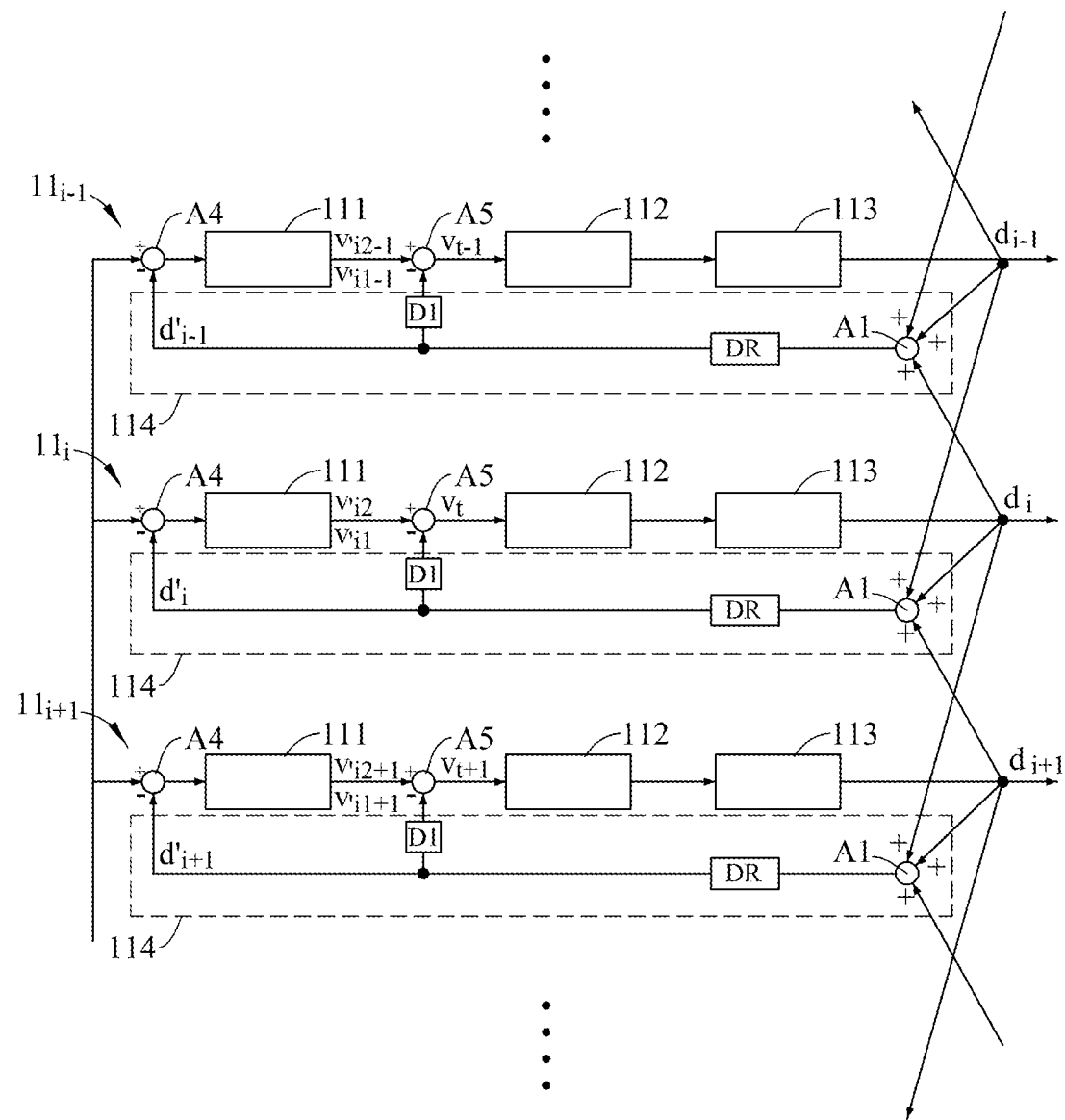
FIG. 2 is the schematic view of the first embodiment of the multi-axis motor synchronization control system in accordance with the present disclosure.

Please refer to FIG. 2, which is the schematic view of the first embodiment of the multi-axis motor synchronization control system in accordance with the present disclosure. FIG. 2 illustrates one of the preferred structures of the first embodiment of the multi-axis motor synchronization control system in accordance with the present disclosure. As shown in FIG. 2, the multi-axis motor synchronization control system 1 may include a plurality of driving axes $11_{i-1}$, $11_i$, $11_{i+1}$; each of the driving axes $11_{i-1}$, $11_i$, $11_{i+1}$ may include a position loop controller 111, a velocity loop controller 112, a motor 113, a synchronization calibration device 114, and a plurality of adders A4, A5.

Regarding the driving axis $11_i$, the position loop controller 111 may generate the velocity signal according to the position command PC, and transmit the velocity signal to the velocity loop controller 112. The velocity loop controller 112 may generate the velocity command according to the velocity signal, and transmit the velocity command to the motor 113. The motor 113 can operate according to the velocity command.

The synchronization calibration device 114 may include an adder A1, a divider DR, and a differentiator D1. The adder A1 may calculate the sum of the position feedback signal $d_i$ of the motor 113 of the driving axis $11_i$ and the position feedback signals, $d_{i-1}$, $d_{i+1}$, of the motors 113 of the adjacent driving axes, $11_{i-1}$, $11_{i+1}$; the divider DR may calculate the average value $d'_i$ according to the sum; the differentiator D1 may differentiate the average value $d'_i$ to generate a first velocity compensation value $v'_{i1}$; the adder A4 may deduct the average value $d'_i$ from the position command PC, and then feedback which to the position loop controller 111 of the driving axis $11_i$ to generate a second velocity compensation value $v'_{i2}$.

The adder A5 may deduct the first velocity compensation value $v'_{i1}$ from the second velocity compensation value $v'_{i2}$ to generate a total velocity compensation value $v_t$, and then feed back the total velocity compensation value $v_t$ to the velocity loop controller 112 to generate the control command to control the motor 113. Each of the driving axes of the multi-axis motor synchronization control system 1 may execute the above process in order to perform the synchronization calibration.

As described above, the synchronization calibration device 114 introduces the concept of the virtual feedback to preprocess the feedback of each of the driving axes of multi-axis motor synchronization control system, which can perform the synchronization calibration for the velocities and the positions between these driving axes so as to make these driving axes operate synchronously. The definition of the virtual position feedback is as follows:

$$d'_i = \frac{1}{n} \sum_{k=i-(n-2)}^{k=i+(n-2)} d_k, n = 3, 5, 7\cdots;$$

In the above equation, d'i stands for the virtual position feedback signal of the motor of the $i_{th}$ driving axis; di stands for the position feedback signal of the motor of the $i_{th}$ driving axis; n stands for the average sampled driving axis number. The definition of the virtual velocity feedback is as follows:

$$v'_i = \frac{1}{n} \sum_{k=i-(n-2)}^{k=i+(n-2)} v_k, n = 3, 5, 7\cdots;$$

In the above equation, v'i stands for the virtual velocity feedback signal of the motor of the $i_{th}$ driving axis; vi stands for the velocity feedback signal of the motor of the $i_{th}$ driving axis; n stands for the average sampled driving axis number.

Via the concept of the virtual feedback, the multi-axis motor synchronization control system 1 can average the position feedback signals and the velocity feedback signals of several adjacent driving axes so as to eliminate the synchronized errors of all driving axes of the multi-axis synchronization system for the purpose of enhancing its robustness.

Figure 3:
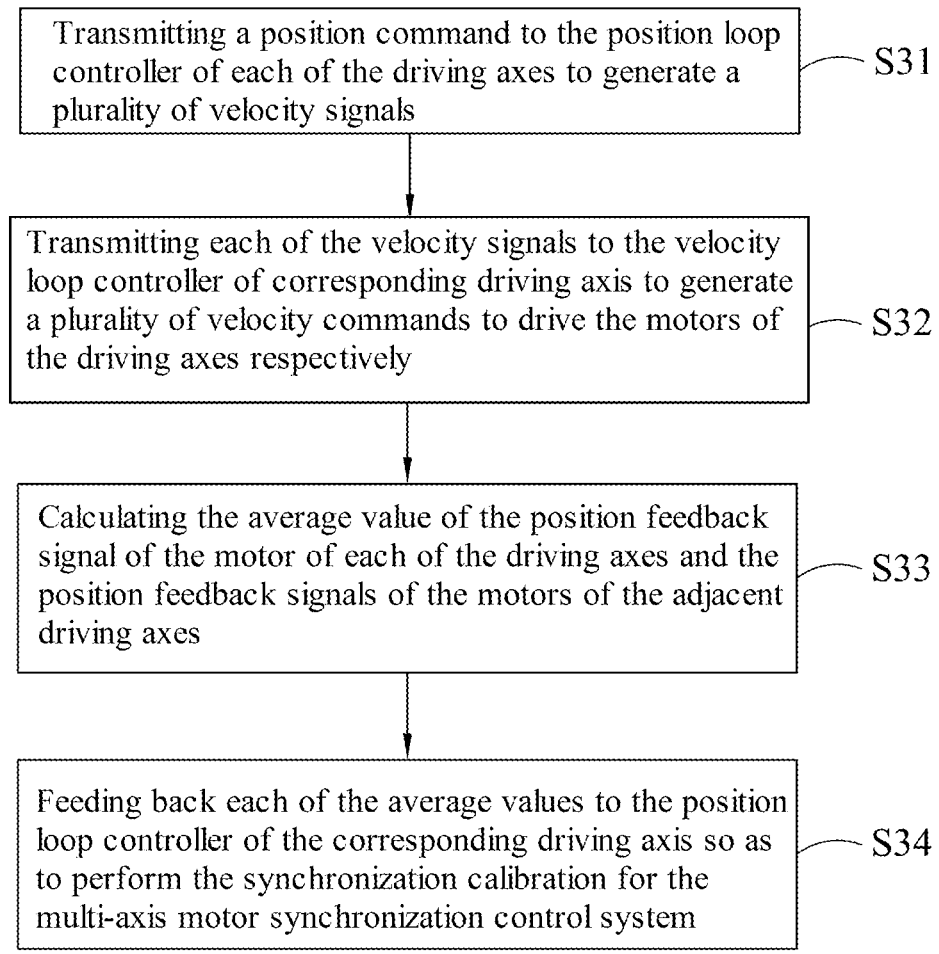
FIG. 3 is the flow chart of the first embodiment of the multi-axis motor synchronization control system in accordance with the present disclosure.

Please refer to FIG. 3, which is the flow chart of the first embodiment of the multi-axis motor synchronization control system in accordance with the present disclosure. The embodiment may include the following steps:

In the step S31: transmitting a position command to the position loop controller of each of the driving axes to generate a plurality of velocity signals.

In the step S32: transmitting each of the velocity signals to the velocity loop controller of corresponding driving axis to generate a plurality of velocity commands to drive the motors of the driving axes respectively.

In the step S33: calculating the average value of the position feedback signal of the motor of each of the driving axes and the position feedback signals of the motors of the adjacent driving axes.

In the step S34: feeding back each of the average values to the position loop controller of the corresponding driving axis so as to perform the synchronization calibration for the multi-axis motor synchronization control system.

Figure 4:
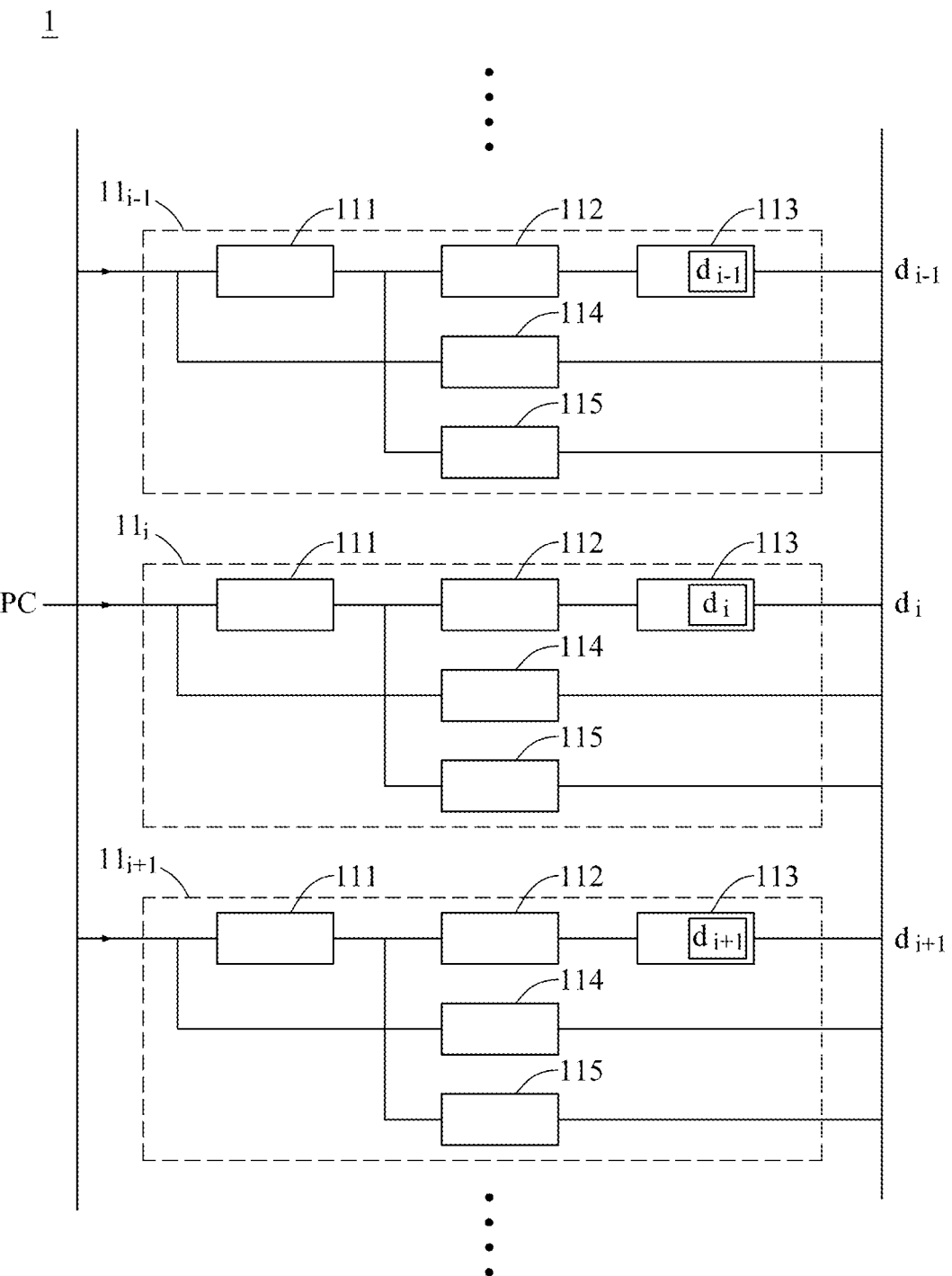
FIG. 4 is the block diagram of the second embodiment of the multi-axis motor synchronization control system in accordance with the present disclosure.

Please refer to FIG. 4, which is the block diagram of the second embodiment of the multi-axis motor synchronization control system in accordance with the present disclosure. As shown in FIG. 4, the multi-axis motor synchronization control system 1 may include a plurality of driving axes $11_{i-1}$, $11_i$, $11_{i+1}$; each of the driving axes $11_{i-1}$, $11_i$, $11_{i+1}$ may include a position loop controller 111, a velocity loop controller 112, a motor 113, a synchronization calibration device 114, and a synchronization compensation device 115.

Regarding the driving axis $11_i$, the position loop controller 111 may generate the velocity signal according to the position command, and transmit the velocity signal to the velocity loop controller 112. The velocity loop controller 112 may generate the velocity command according to the velocity signal, and transmit the velocity command to the motor 113. The motor 113 can operate according to the velocity command. The synchronization calibration device 114 may calculate the average value of the position feedback signal $d_i$ of the motor 113 and the position feedback signals, $d_{i-1}$, $d_{i+1}$, of the adjacent driving axes, $11_{i-1}$, $11_{i+1}$, and then feedback the average value to the position loop controller 111 and the velocity loop controller 112. Each of the driving axes of the multi-axis motor synchronization control system 1 may execute the above process in order to perform the first-time synchronization calibration.

The synchronization compensation device 115 may calculate the cross-coupled synchronized error of the driving axes $11_{i-1}$, $11_i$, $11_{i+1}$ according to the position feedback signal $d_i$ of the motor 113 of the driving axis $11_i$ and the position feedback signals, $d_{i-1}$, $d_{i+1}$, of motors 113 of the adjacent driving axes, $11_{i-1}$, $11_{i+1}$, and then feedback the cross-coupled synchronized error to the velocity loop controller 112 of the driving axis $11_i$ in order to perform the second-time synchronization calibration. Each of the driving axes of the multi-axis motor synchronization control system 1 may execute the above process in order to perform the synchronization calibration.

Figure 5:
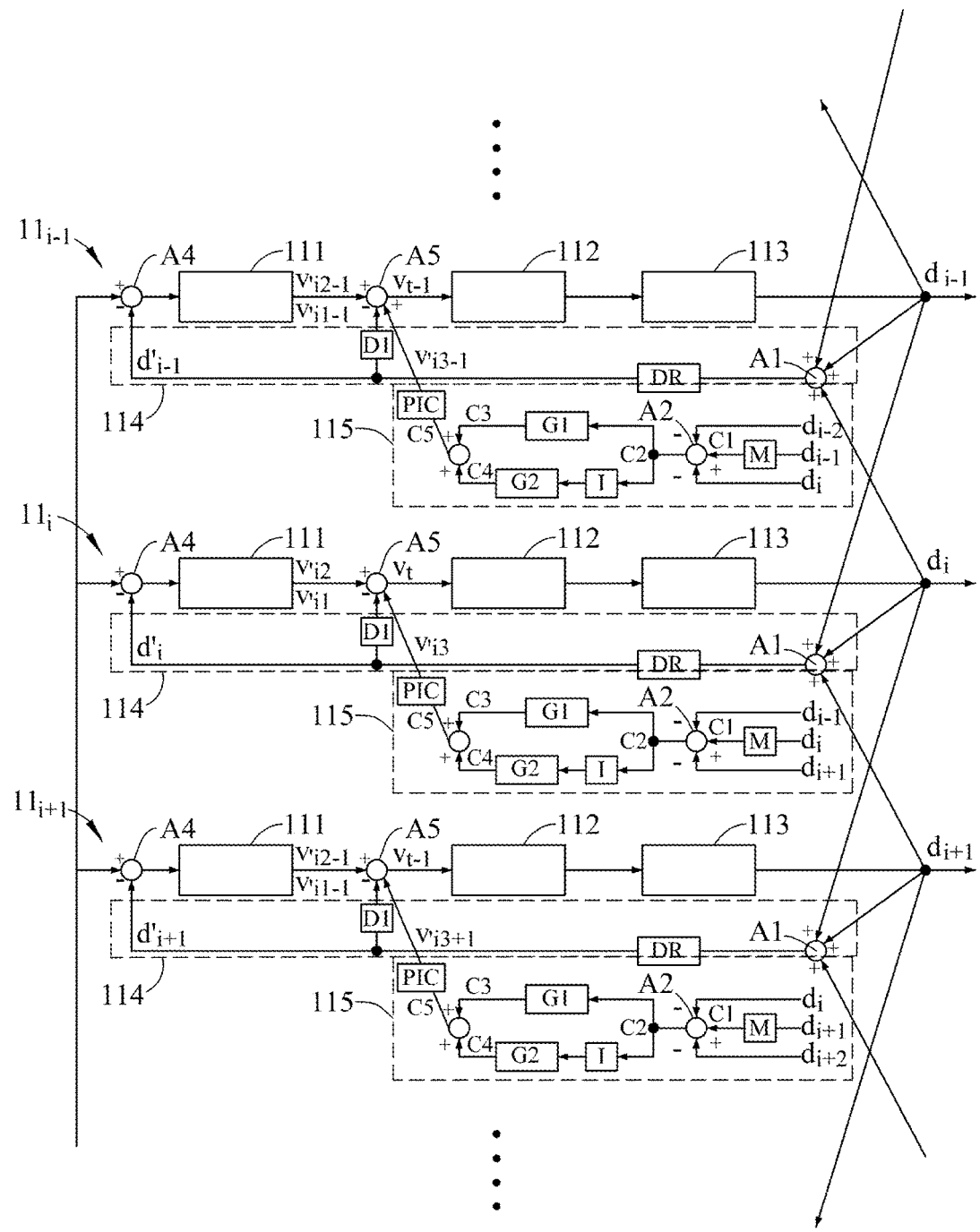
FIG. 5 is the schematic view of the second embodiment of the multi-axis motor synchronization control system in accordance with the present disclosure.

Please refer to FIG. 5, which is the schematic view of the second embodiment of the multi-axis motor synchronization control system in accordance with the present disclosure. FIG. 5 illustrates one of the preferred structures of the second embodiment of the multi-axis motor synchronization control system in accordance with the present disclosure. As shown in FIG. 5, the multi-axis motor synchronization control system 1 may include a plurality of driving axes $11_{i-1}$, $11_i$, $11_{i+1}$; each of the driving axes $11_{i-1}$, $11_i$, $11_{i+1}$ may include a position loop controller 111, a velocity loop controller 112, a motor 113, a synchronization calibration device 114, a synchronization compensation device 115, and a plurality of adders A4, A5.

Regarding the driving axis $11_i$, the position loop controller 111 may generate the velocity signal according to the position command PC, and transmit the velocity signal to the velocity loop controller 112. The velocity loop controller 112 may generate the velocity command according to the velocity signal, and transmit the velocity command to the motor 113. The motor 113 can operate according to the velocity command.

The synchronization calibration device 114 may include an adder A1, a divider DR, and a differentiator D1. The adder A1 may calculate the sum of the position feedback signal $d_i$ of the motor 113 and the position feedback signals, $d_{i-1}$, $d_{i+1}$, of the motors 113 of the adjacent driving axes, $11_{i-1}$, $11_{i+1}$; the divider DR may calculate the average value $d'_i$ according to the sum; the differentiator D1 may differentiate the average value $d'_i$ to generate a first velocity compensation value $v'_{i1}$; the adder A4 may deduct the average value $d'_i$ from the position command PC, and then feedback which to the position loop controller 111 to generate a second velocity compensation value $v'_{i2}$.

The synchronization compensation device 115 can provide the cross-coupled synchronization compensation function, which may include a multiplier M, an adder A2, an adder A3, an integrator I, a transfer function controller G1, a transfer function controller G2, and a proportional-integral controller PIC. More specifically, the multiplier M may multiply the position feedback signal $d_i$ of the motor 113 of the driving axis $11_i$ by 2 to generate a first calculation value C1; the adder 12 may deduct the position feedback signals $d_{i-1}$, $d_{i+1}$ of the motors 113 of the adjacent driving axes $11_{i-1}$, $11_{i+1}$ from the first calculation value C1 to generate a second calculation value C2; the second calculation value C2 may be processed by the transfer function controller G1 to generate a third calculation C3; the first calculation value C1 may be processed by the integrator I and the transfer function controller G2 to generate a fourth calculation value C4; the adder A3 may add the third calculation value C3 to the fourth calculation value C4 to generate a fifth calculation value C5; the proportional-integral controller PIC may generate a third velocity compensation value $v'_{i3}$ according to the fifth calculation value C5.

The adder A5 may calculate the sum of the second velocity compensation value $v'_{i2}$ and the third velocity compensation value $v'_{i3}$, and then deduct the first velocity compensation value $v'_{i1}$ from the sum to generate a total velocity compensation value $v_t$, and then feed back the total velocity compensation value $v_t$ to the velocity loop controller 112 to generate the control command to control the motor 113. Each of the driving axes of the multi-axis motor synchronization control system 1 may execute the above process in order to perform the synchronization calibration.

As described above, via the cross-coupled synchronization compensation technology, the embodiment can effectively eliminate the synchronized errors between all driving axes of the multi-axis motor synchronization control system 1; more specifically, the embodiment uses the synchronization compensation device 11 to compensate for and modify the synchronized errors between the driving axes, where the synchronized errors of two adjacent driving axes are as follows:

$$\varphi_i = d_i - d_{i-1}$$

$$\varphi_{i+1} = d_i - d_{i+1};$$

In the above equations, $\varphi_i$ stands for the synchronized error of the $i_{th}$ driving axis; $d_i$ stands for the position feedback signal of the motor of the $i_{th}$ driving axis. The cross-coupled synchronized error can be derived as follows:

$$\varepsilon_i = \varphi_i + \varphi_{i+1};$$

In the above equation, $\varepsilon_i$ stands for the cross-coupled synchronized error of the $i_{th}$ driving axis, which includes the synchronized errors of two driving axes; the cross-coupled synchronized error conversion equation of multiple driving axes is as follows:

$$\varepsilon_i = n \times d_i - \sum_{k=i-(n-2)}^{k=i+(n-2)} d_k, n = 3, 5, 7 \cdots;$$

In the above equation, $d_i$ is the position feedback signal of the motor of the $i_{th}$ driving axis; n stands for the average sampled driving axis number. The cross-coupled synchronized error calculated by the above cross-coupled synchronized error conversion equation may be processed by the proportional-integral controller PIC, and then which may be inputted into the velocity loop controller 112 to further eliminate the synchronized errors between these driving axes.

As described above, in the embodiment, the multi-axis motor synchronization control system 1 can use the synchronization calibration device 114 to preprocess the feedbacks of multiple driving axes by means of the concept of the virtual feedback so as to perform the first-time synchronization calibration for the velocities and the positions of these driving axes; further, the multi-axis motor synchronization control system 1 can use the synchronization compensation device 115 to further eliminate the synchronized errors between these driving axes by means of the concept of the cross-coupled synchronization compensation technology so as to perform the second-time synchronization calibration for the velocities and the positions of these driving axes. As a result, all driving axes of the multi-axis motor synchronization control system 1 can achieve high-precision synchronous motion.

Figure 6:
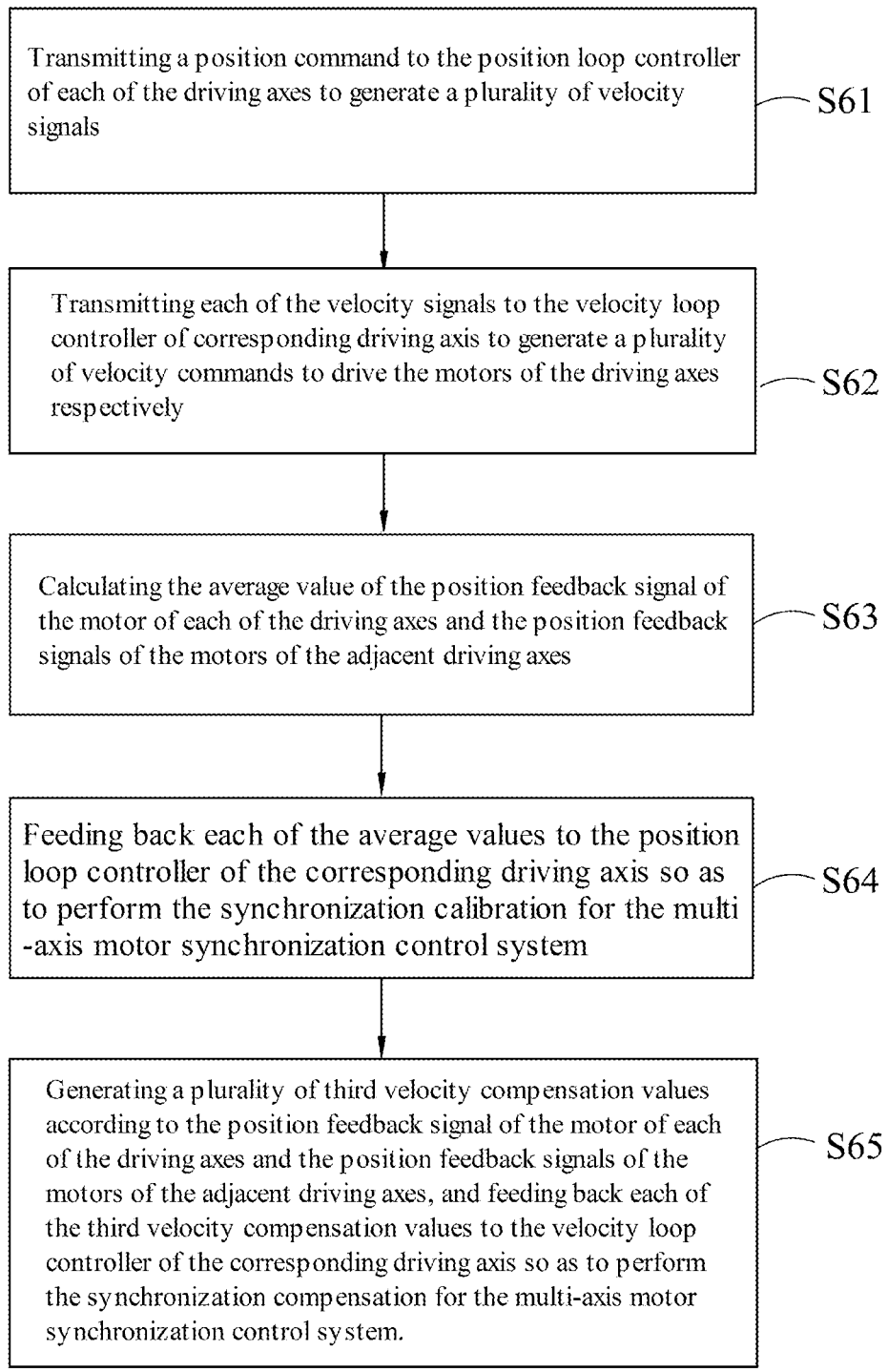
FIG. 6 is the flow chart of the second embodiment of the multi-axis motor synchronization control system in accordance with the present disclosure.

Please refer to FIG. 6, which is the flow chart of the second embodiment of the multi-axis motor synchronization control system in accordance with the present disclosure. The embodiment may include the following steps:

In the step S61: transmitting a position command to the position loop controller of each of the driving axes to generate a plurality of velocity signals.

In the step S62: transmitting each of the velocity signals to the velocity loop controller of corresponding driving axis to generate a plurality of velocity commands to drive the motors of the driving axes respectively.

In the step S63: calculating the average value of the position feedback signal of the motor of each of the driving axes and the position feedback signals of the motors of the adjacent driving axes.

In the step S64: feeding back each of the average values to the position loop controller of the corresponding driving axis so as to perform the synchronization calibration for the multi-axis motor synchronization control system.

In the step S65: generating a plurality of third velocity compensation values according to the position feedback signal of the motor of each of the driving axes and the position feedback signals of the motors of the adjacent driving axes, and feeding back each of the third velocity compensation values to the velocity loop controller of the corresponding driving axis so as to perform the synchronization compensation for the multi-axis motor synchronization control system.

Figure 7:
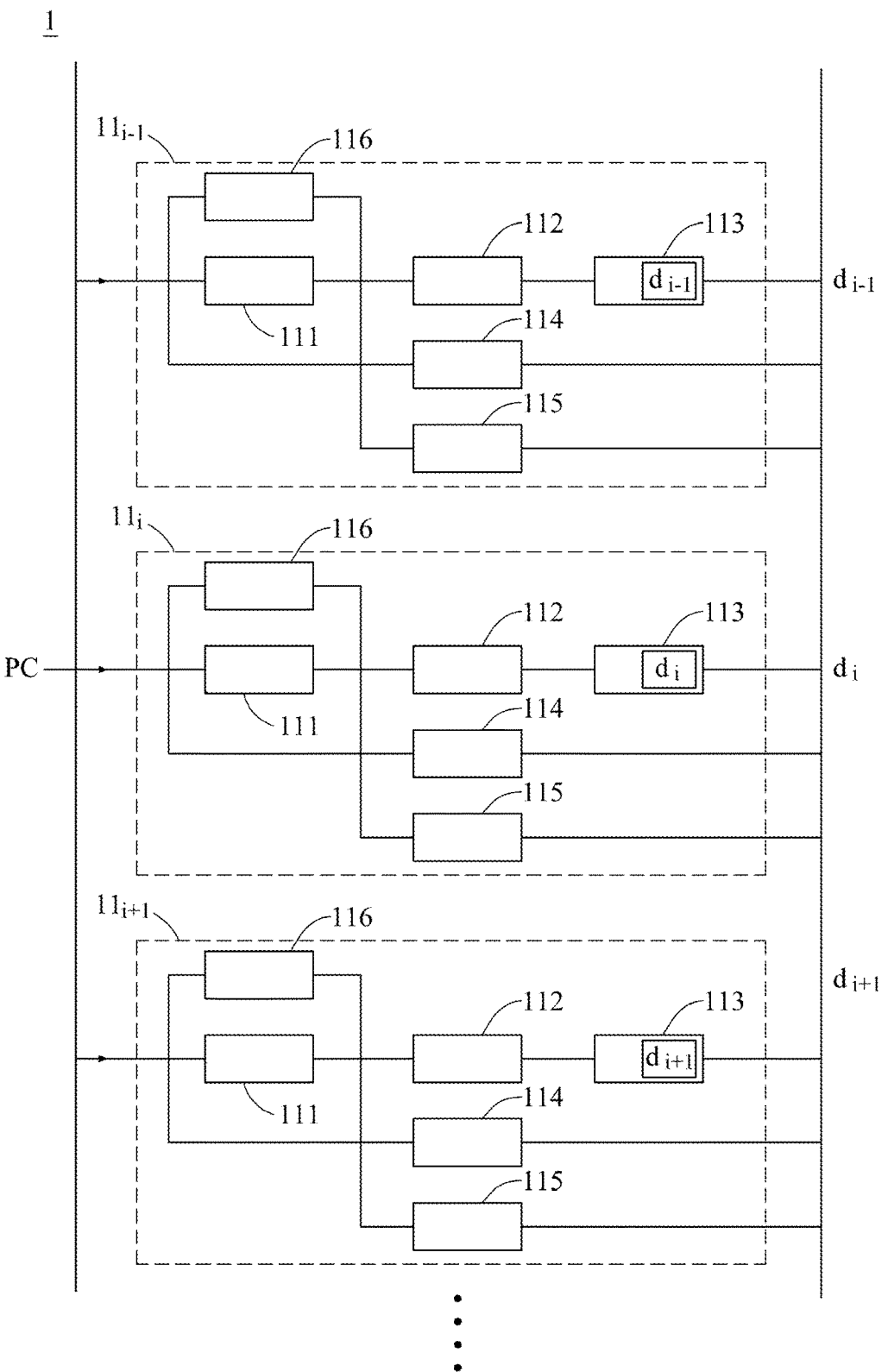
FIG. 7 is the block diagram of the third embodiment of the multi-axis motor synchronization control system in accordance with the present disclosure.

Please refer to FIG. 7, which is the block diagram of the third embodiment of the multi-axis motor synchronization control system in accordance with the present disclosure. As shown in FIG. 1, the multi-axis motor synchronization control system 1 may include a plurality of driving axes $11_{i-1}, 11_i, 11_{i+1}$; each of the driving axes $11_{i-1}, 11_i, 11_{i+1}$ may include a position loop controller 111, a velocity loop controller 112, a motor 113, a synchronization calibration device 114, a synchronization compensation device 115, and a feed-forward control device 116.

Regarding the driving axis $11_i$, the position loop controller 111 may generate the velocity signal according to the position command, and transmit the velocity signal to the velocity loop controller 112. The velocity loop controller 112 may generate the velocity command according to the velocity signal, and transmit the velocity command to the motor 113. The motor 113 can operate according to the velocity command. The synchronization calibration device 114 may calculate the average value of the position feedback signal $d_i$ of the motor 113 and the position feedback signals, $d_{i-1}, d_{i+1}$, of the adjacent driving axes, and then feedback the average value to the position loop controller 111 and the velocity loop controller 112 in order to perform the first-time synchronization calibration.

The synchronization compensation device 115 may calculate the cross-coupled synchronized error of the driving axes $11_{i-1}, 11_i, 11_{i+1}$ according to the position feedback signal $d_i$ of the motor 113 of the driving axis $11_i$ and the position feedback signals, $d_{i-1}, d_{i+1}$, of motors 113 of the adjacent driving axes, $11_{i-1}, 11_{i+1}$, and then feedback the cross-coupled synchronized error to the velocity loop controller 112 of the driving axis $11_i$ so as to perform the second-time synchronization calibration.

The feed-forward control device 116 may perform the feed-forward control to process the position command to generate a compensation value, and feedback the compensation value to the velocity loop controller so as to perform the feed-forward compensation. Each of the driving axes of the multi-axis motor synchronization control system 1 may execute the above process in order to perform the synchronization calibration.

Figure 8:
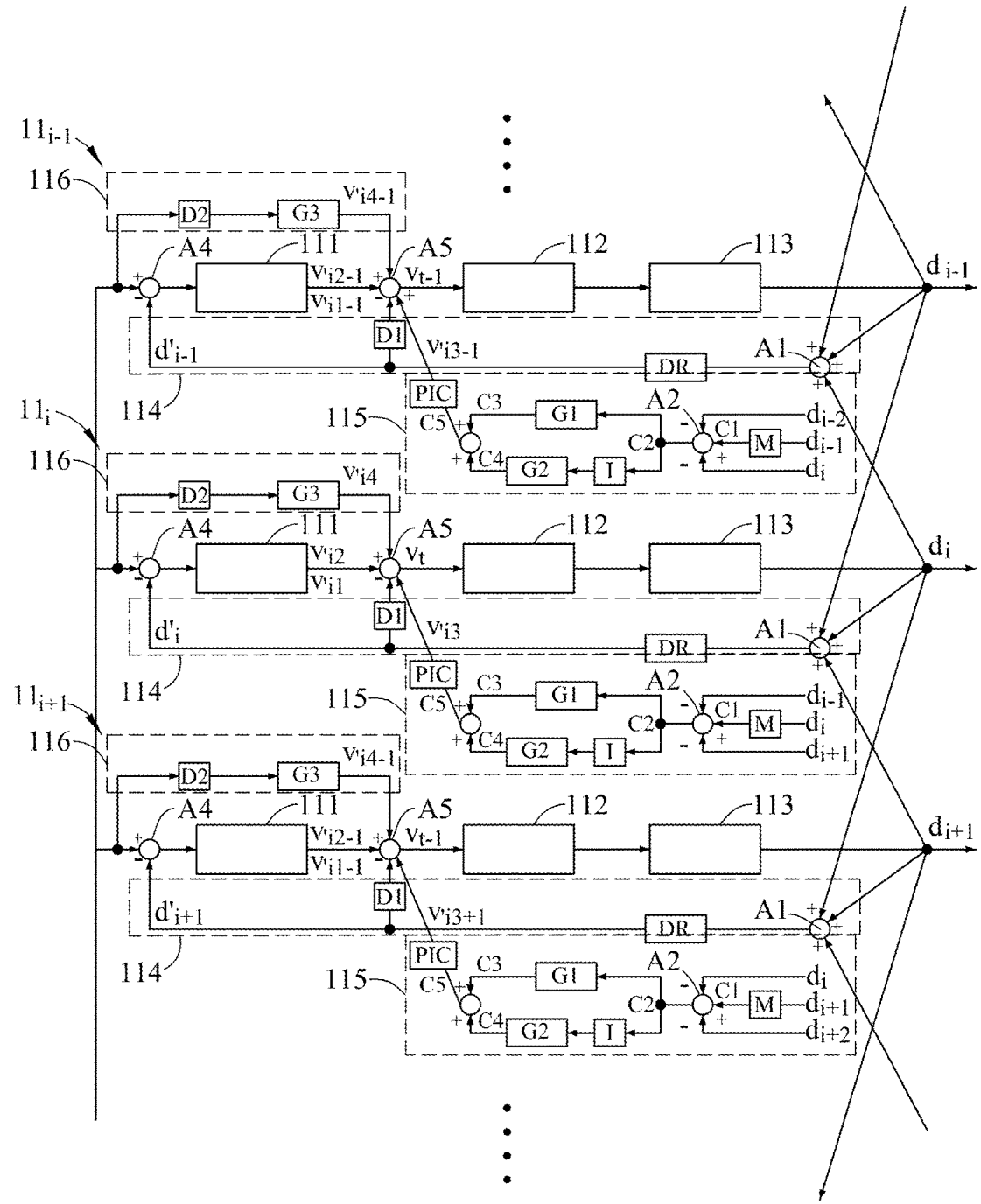
FIG. 8 is the first schematic view of the third embodiment of the multi-axis motor synchronization control system in accordance with the present disclosure.

Please refer to FIG. 8, which is the first schematic view of the third embodiment of the multi-axis motor synchronization control system in accordance with the present disclosure. FIG. 8 illustrates one of the preferred structures of the third embodiment of the multi-axis motor synchronization control system in accordance with the present disclosure. As shown in FIG. 8, the multi-axis motor synchronization control system 1 may include a plurality of driving axes $11_{i-1}, 11_i, 11_{i+1}$; each of the driving axes $11_{i-1}, 11_i, 11_{i+1}$ may include a position loop controller 111, a velocity loop controller 112, a motor 113, a synchronization calibration device 114, a synchronization compensation device 115, a feed-forward control device 116 and a plurality of adders A4, A5.

Regarding the driving axis $11_i$, the position loop controller 111 may generate the velocity signal according to the position command PC, and transmit the velocity signal to the velocity loop controller 112. The velocity loop controller 112 may generate the velocity command according to the velocity signal, and transmit the velocity command to the motor 113. The motor 113 can operate according to the velocity command.

The synchronization calibration device 114 may include an adder A1, a divider DR, and a differentiator D1. The adder A1 may calculate the sum of the position feedback signal $d_i$ of the motor 113 and the position feedback signals, $d_{i-1}$, $d_{i+1}$, of the motors 113 of the adjacent driving axes, $11_{i-1}$, $11_{i+1}$; the divider DR may calculate the average value $d'_i$ according to the sum; the differentiator D1 may differentiate the average value $d'_i$ to generate a first velocity compensation value $v'_{i1}$; the adder A4 may deduct the average value $d'_i$ from the position command PC, and then feedback which to the position loop controller 111 to generate a second velocity compensation value $v'_{i2}$.

The synchronization compensation device 115 can provide the cross-coupled synchronization compensation function, which may include a multiplier M, an adder A2, an adder A3, an integrator I, a transfer function controller G1, a transfer function controller G2, and a proportional-integral controller PIC. More specifically, the multiplier M may multiply the position feedback signal $d_i$ of the motor 113 of the driving axis $11_i$ by 2 to generate a first calculation value C1; the adder 12 may deduct the position feedback signals $d_{i-1}$, $d_{i+1}$ of the motors 113 of the adjacent driving axes $11_{i-1}$, $11_{i+11}$ from the first calculation value C1 to generate a second calculation value C2; the second calculation value C2 may be processed by the transfer function controller G1 to generate a third calculation C3; the first calculation value C1 may be processed by the integrator I and the transfer function controller G2 to generate a fourth calculation value C4; the adder A3 may add the third calculation value C3 to the fourth calculation value C4 to generate a fifth calculation value C5; the proportional-integral controller PIC may generate a third velocity compensation value $v_{i3}$ according to the fifth calculation value C5.

The feed-forward control device 116 may perform the feed-forward control to achieve feed-forward compensation, which may include a differentiator D2 and a transfer function controller G3; the position command PC can be processed by the differentiator D2 and the transfer function controller G3 to generate a fourth velocity compensation value $v'_{i4}$.

The adder A5 may calculate the sum of the second velocity compensation value $v'_{i2}$, the third velocity compensation value $v'_{i3}$, and the fourth velocity compensation value $v'_{i4}$, and then deduct the first velocity compensation value $v'_{i1}$ from the sum to generate a total velocity compensation value $v_t$, and then feed back the total velocity compensation value $v_t$ to the velocity loop controller 112 to generate the control command to control the motor 113. Each of the driving axes of the multi-axis motor synchronization control system 1 may execute the above process in order to perform the synchronization calibration.

As described above, in the embodiment, the multi-axis motor synchronization control system 1 can use the synchronization calibration device 114 to preprocess the feedbacks of multiple driving axes by means of the concept of the virtual feedback so as to perform the first-time synchronization calibration for the velocities and the positions of these driving axes; in addition, the multi-axis motor synchronization control system 1 can use the synchronization compensation device 115 to further eliminate the synchronized errors between these driving axes by means of the concept of the cross-coupled synchronization compensation technology so as to perform the second-time synchronization calibration for the velocities and the positions of these driving axes. Furthermore, the multi-axis motor synchronization control system 1 can use the feed-forward control device 116 to feed-forward the position command to the velocity loop controller 112 so as to compensate for the phase delay due to the multi-axis synchronization control. As a result, all driving axes of the multi-axis motor synchronization control system 1 can achieve high-precision synchronous motion.

Besides, in the embodiment, the control method of the multi-axis motor synchronization control system 1 can be realized by simple control algorithm; thus, the cost multi-axis motor synchronization control system 1 can be further reduced.

Moreover, in the embodiment, the multi-axis motor synchronization control system 1 can be easily modularized and totally digitized; for the reason, the multi-axis motor synchronization control system 1 can be directly applied to most of currently available control systems; thus, the multi-axis motor synchronization control system 1 is of high commercial value.

Figure 9:
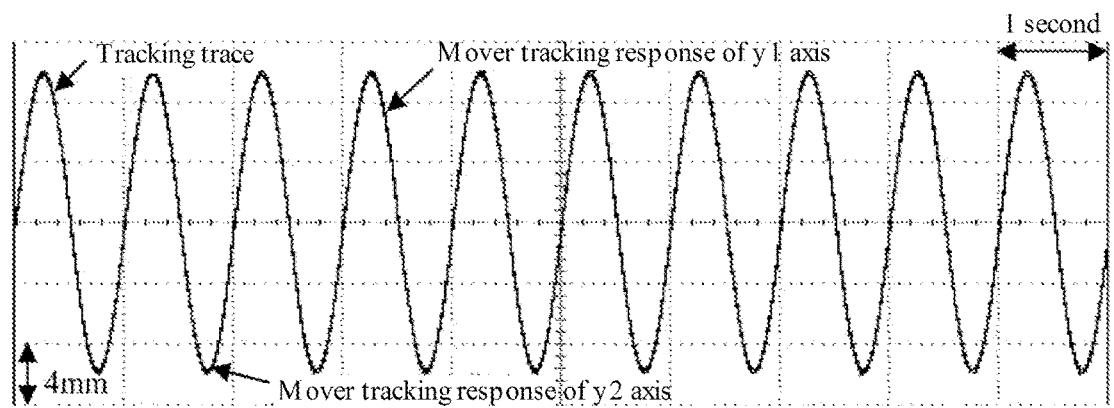
FIG. 9 is the second schematic view of the third embodiment of the multi-axis motor synchronization control system in accordance with the present disclosure.
Figure 10:
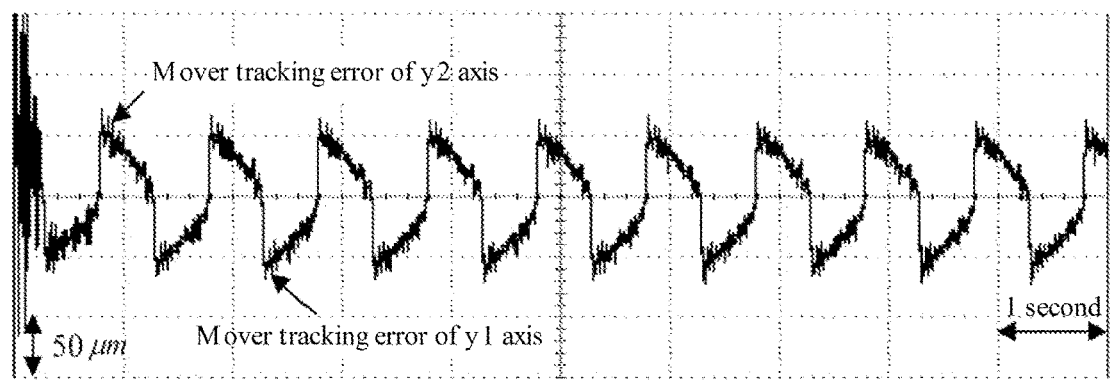
FIG. 10 is the third schematic view of the third embodiment of the multi-axis motor synchronization control system in accordance with the present disclosure.
Figure 11:
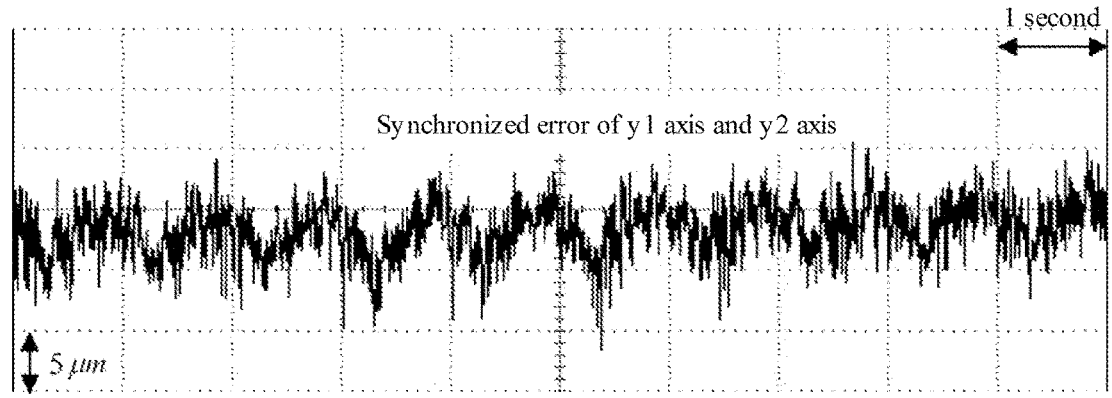
FIG. 11 is the fourth schematic view of the third embodiment of the multi-axis motor synchronization control system in accordance with the present disclosure.

Please refer to FIG. 9, FIG. 10, and FIG. 11, which are the second schematic view, the third schematic view, and the fourth schematic view of the multi-axis motor synchronization control system in accordance with the present disclosure. FIG. 9, FIG. 10, and FIG. 11 illustrate the experiment results of the experiment based on the structure of the embodiment, where y1 axis and y2 axis stands for two adjacent driving axes. FIG. 9 illustrates the tracking traces and the mover tracking responses of y1 axis and y2 axis. FIG. 10 illustrates the mover tracking errors of y1 axis and y2 axis. FIG. 10 illustrates the synchronized error of y1 axis and y2 axis. According to FIG. 10, it is obvious that the structure of the embodiment can significantly reduce the synchronized error of y1 axis and y2.

Figure 12:
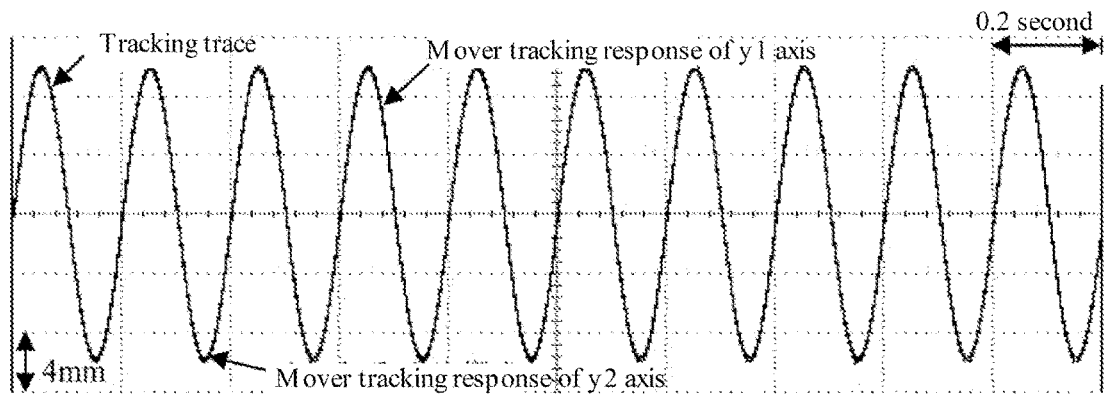
FIG. 12 is the fifth schematic view of the third embodiment of the multi-axis motor synchronization control system in accordance with the present disclosure.
Figure 13:
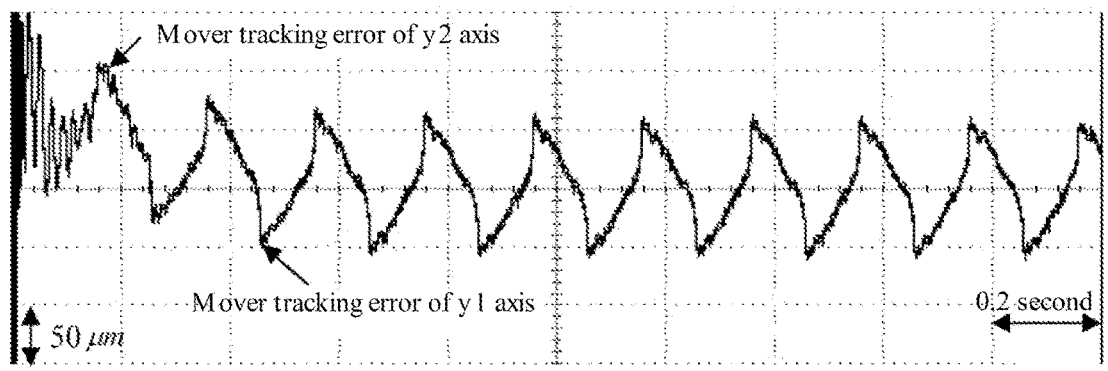
FIG. 13 is the sixth schematic view of the third embodiment of the multi-axis motor synchronization control system in accordance with the present disclosure.
Figure 14:
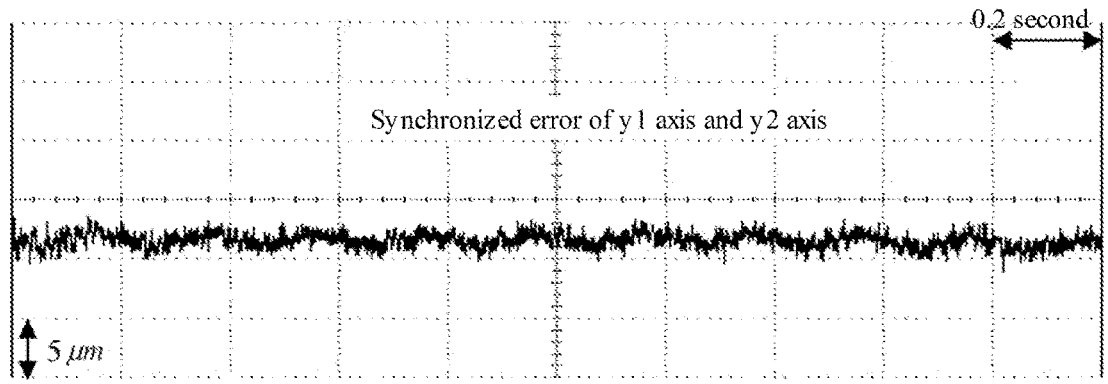
FIG. 14 is the seventh schematic view of the third embodiment of the multi-axis motor synchronization control system in accordance with the present disclosure.

Please refer to FIG. 12, FIG. 13, and FIG. 14, which are the fifth schematic view, the sixth schematic view, and the seventh schematic view of the multi-axis motor synchronization control system in accordance with the present disclosure. FIG. 12, FIG. 13, and FIG. 14 illustrate the experiment results of the experiment based on the structure of the embodiment; in the experiment, the parameters of the transfer function controller G1 and the transfer function controller G2 of the synchronization compensation device 115 are already optimized. Similarly, y1 axis and y2 axis stands for two adjacent driving axes. FIG. 12 illustrates the tracking traces and the mover tracking responses of y1 axis and y2 axis. FIG. 13 illustrates the mover tracking errors of y1 axis and y2 axis. FIG. 14 illustrates the synchronized error of y1 axis and y2 axis. According to FIG. 14, it is obvious that the synchronized error of y1 axis and y2 can be further decreased after the parameters of the transfer function controller G1 and the transfer function controller G2 of the synchronization compensation device 115 are optimized.

Figure 15:
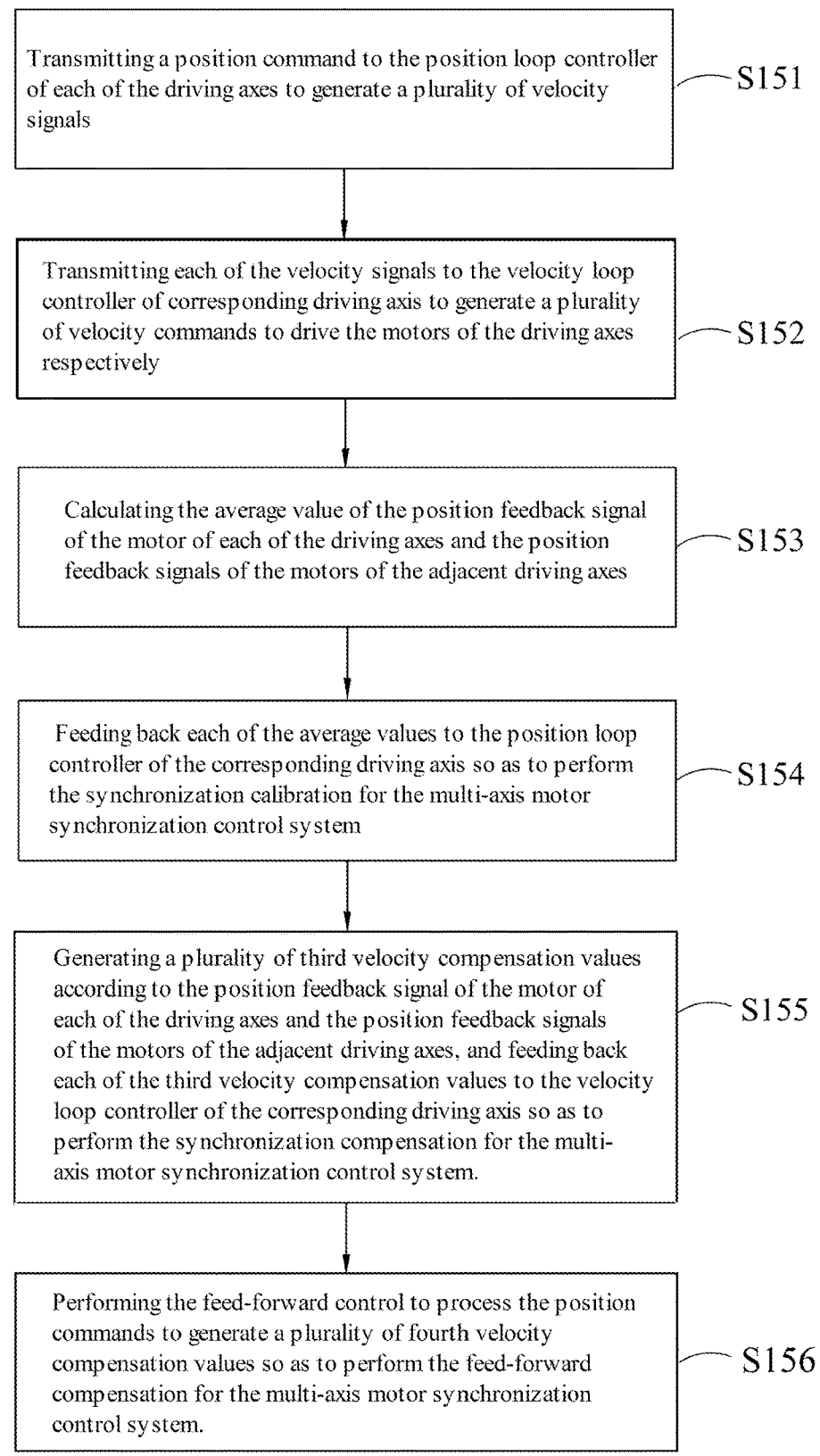
FIG. 15 is the flow chart of the third embodiment of the multi-axis motor synchronization control system in accordance with the present disclosure.

Please refer to FIG. 15, which is the flow chart of the third embodiment of the multi-axis motor synchronization control system in accordance with the present disclosure. The embodiment may include the following steps:

In the step S151: transmitting a position command to the position loop controller of each of the driving axes to generate a plurality of velocity signals.

In the step S152: transmitting each of the velocity signals to the velocity loop controller of corresponding driving axis to generate a plurality of velocity commands to drive the motors of the driving axes respectively.

In the step S153: calculating the average value of the position feedback signal of the motor of each of the driving axes and the position feedback signals of the motors of the adjacent driving axes.

In the step S154: feeding back each of the average values to the position loop controller of the corresponding driving axis so as to perform the synchronization calibration for the multi-axis motor synchronization control system.

In the step S155: generating a plurality of third velocity compensation values according to the position feedback signal of the motor of each of the driving axes and the position feedback signals of the motors of the adjacent driving axes, and feeding back each of the third velocity compensation values to the velocity loop controller of the corresponding driving axis so as to perform the synchronization compensation for the multi-axis motor synchronization control system.

In the step S156: performing the feed-forward control to process the position commands to generate a plurality of fourth velocity compensation values so as to perform the feed-forward compensation for the multi-axis motor synchronization control system.

In summation of the description above, the multi-axis motor synchronization control system and the method thereof in accordance with the embodiments of the present disclosure may have the following advantages:

(1) According to one embodiment of the present disclosure, the control method of the multi-axis motor synchronization control system can be effectively applied to any multi-axis motor synchronization control system with more than two driving axes. Thus, the application range of the multi-axis motor synchronization control system is very comprehensive.

(2) According to one embodiment of the present disclosure, the multi-axis motor synchronization control system may further include a synchronization calibration device. The synchronization calibration device introduces the concept of the virtual feedback to preprocess the feedback of each of the driving axes of the multi-axis motor synchronization control system so as to perform the first-time synchronization calibration for the velocities and the positions of all driving axes of the multi-axis motor synchronization control system. Therefore, all driving axes of the multi-axis motor synchronization control system can precisely achieve synchronous motion.

(3) According to one embodiment of the present disclosure, the multi-axis motor synchronization control system may further include a synchronization compensation device, which can provide the multi-axis cross-coupled function to execute the second-time synchronization calibration so as to compensate for the synchronized errors between all driving axes; accordingly, the synchronous responses of all driving axes can be further increased and all driving axes of the multi-axis motor synchronization control system can achieve synchronous motion more precisely.

(4) According to one embodiment of the present disclosure, the multi-axis motor synchronization control system may further include a feed-forward control device to feed-forward the position command to the velocity loop controller, which can effectively compensate for the phase delay due to the multi-axis synchronization control.

(5) According to one embodiment of the present disclosure, the control method of the multi-axis motor synchronization control system can be realized by simple control algorithm; thus, the cost of the multi-axis motor synchronization control system can be further reduced.

(6) According to one embodiment of the present disclosure, the multi-axis motor synchronization control system can be easily modularized and totally digitized; thus, the multi-axis motor synchronization control system can be directly applied to most of currently available control systems, so the multi-axis motor synchronization control system can be of high commercial value.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A multi-axis motor synchronization control system, comprising:
a plurality of driving axes, wherein the driving axes are coupled to one another, and each one of the driving axes further comprises:
a position loop controller, configured to generate a velocity signal according to a position command;
a velocity loop controller, configured to generates a velocity command according to the velocity signal;
a motor, configured to operate according to the velocity signal;
a synchronization calibration device, configured to receive position feedback signals of the motors of the adjacent driving axes, and calculate an average value of a position feedback signal of the motor and the position feedback signals of the motors of the adjacent driving axes, and differentiate the average value to generate a first velocity compensation value, and then feedback the-first velocity compensation value to the position loop controller so as to perform a synchronization calibration between the driving axis and the adjacent driving axes thereof;
a synchronization compensation device, configured to generate a third velocity compensation value according to the position feedback signal of the motor and the position feedback signals of the motors of the adjacent driving axes, and feedback the third velocity compensation value to the velocity loop controller so as to perform a synchronization compensation;
a feed-forward control device, configured to perform a feed-forward control to process the position command to generate a fourth velocity compensation value, and feedback the fourth velocity compensation value to the velocity loop controller so as to perform a feed-forward compensation; and
a fourth adder, configured to deduct the average value from the position command to generate a position compensation value, and feedbacks the position compensation value to the position loop controller to generate a second velocity compensation value, and the position loop controller feedbacks the second velocity compensation value to the velocity loop controller.

2. The multi-axis motor synchronization control system of claim 1, wherein the synchronization calibration device comprises a first adder, a divider, and a first differentiator.

3. The multi-axis motor synchronization control system of claim 2, wherein the first adder and the divider calculates the average value, and the first differentiator differentiates the average value to generate the first velocity compensation value.

4. The multi-axis motor synchronization control system of claim 1, wherein the synchronization compensation device comprises a multiplier, a second adder, a third adder, an integrator, a first transfer function controller, a second transfer function controller, and a proportional-integral controller.

5. The multi-axis motor synchronization control system of claim 4, wherein the multiplier multiplies the position feedback signal by an integral to generate a first calculation value; the second adder deducts the position feedback signals of the motors of the adjacent driving axes from the first calculation value to generate a second calculation value; the first transfer function controller processes the first calculation value to generate a third calculation value; a differentiator and the second transfer function controller process the first calculation value to generate a fourth calculation value; the third adder sums up the third calculation value to the fourth calculation value to generate a fifth calculation value; the proportional-integral controller generates the third velocity compensation value according to the fifth calculation value.

6. The multi-axis motor synchronization control system of claim 1, wherein the feed-forward control device comprises a second differentiator and a third transfer function controller.

7. The multi-axis motor synchronization control system of claim 6, wherein the position command is processed by the second differentiator and the third transfer function controller to generate the fourth velocity compensation value.

8. The multi-axis motor synchronization control system of claim 1, wherein any one of the driving axes further comprises a fifth adder configured to calculate a sum of the second velocity compensation value, the third velocity compensation value, and the fourth velocity compensation value, and deduct the first velocity compensation value from the sum to generate a total velocity compensation value, and feed it back to the velocity loop controller of the corresponding driving axis.

9. The multi-axis motor synchronization control system of claim 8, wherein the velocity loop controller of the corresponding driving axis generates the velocity command according to the total velocity compensation value so as to operate the motor of the corresponding driving axis according to the total velocity compensation value.

10. A multi-axis motor synchronization method, wherein the method is used to control a multi-axis motor synchronization control system, and the multi-axis motor synchronization control system comprises a plurality of driving axes, and the driving axes are coupled to one another; the method comprising the following steps:

transmitting a position command to a position loop controller of each of the driving axes to generate a plurality of velocity signals;

transmitting each of the velocity signals to a velocity loop controller of the corresponding driving axis to generate a plurality of velocity commands to drive motors of the driving axes respectively;

receiving position feedback signals of the motors of the adjacent driving axes of each driving axis and calculating an average value of a position feedback signal of the motor thereof and the position feedback signals of the motors of the adjacent driving axes;

feeding back each of the average values to the position loop controller of the corresponding driving axis so as to perform a synchronization calibration between each of the driving axes and the adjacent driving axes thereof;

differentiating each of the average values to generate a plurality of first velocity compensation values and feeding back each of the first velocity compensation values to the velocity loop controller of the corresponding driving axis so as to perform the synchronization calibration;

generating a plurality of third velocity compensation values according to the position feedback signal of the motor of each of the driving axes and the position feedback signals of the motors of the adjacent driving axes, and feeding back each of the third velocity compensation values to the velocity loop controller of the corresponding driving axis so as to perform a synchronization compensation for the multi-axis motor synchronization control system;

performing a feed-forward control to process the position commands to generate a plurality of fourth velocity compensation values so as to perform a feed-forward compensation; and deducting each of the average value from the position command for each of driving axes to generate a plurality of position compensation values, and feeding back each of the position compensation values to the position loop controller of the corresponding driving axis so as to generate a plurality of second velocity compensation values.

11. The multi-axis motor synchronization method of claim 10, further comprising the following steps:

calculating a sum of the second velocity compensation value, the third velocity compensation value, and the fourth velocity compensation value of each of the driving axes, and deducting the corresponding first velocity compensation value from the sum to generate a plurality of total velocity compensation values.

12. The multi-axis motor synchronization method of claim 11, further comprising the following steps:

feeding back each of the total velocity compensation values to the velocity loop controller of the corresponding driving axis so as to operate the motor of the corresponding driving axis.

* * * * *